June 17, 1952 — E. H. CARRUTHERS — 2,601,093
METHOD AND APPARATUS FOR PACKAGING A PREDETERMINED
WEIGHT OF FOOD MATERIAL
Filed April 14, 1948 — 4 Sheets-Sheet 1

INVENTOR.
EBEN HUNTER CARRUTHERS
BY

June 17, 1952     E. H. CARRUTHERS     2,601,093
METHOD AND APPARATUS FOR PACKAGING A PREDETERMINED
WEIGHT OF FOOD MATERIAL
Filed April 14, 1948     4 Sheets-Sheet 2
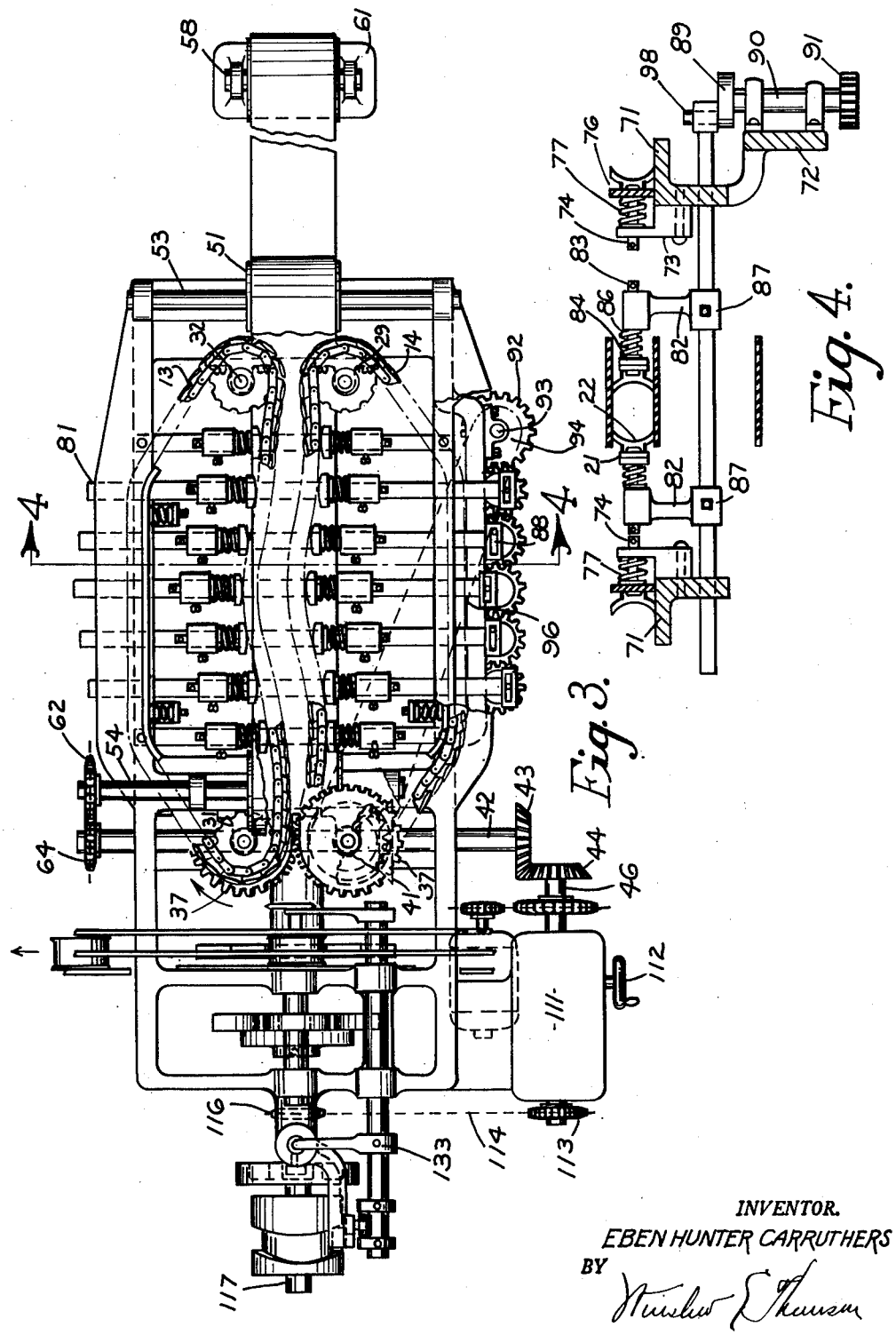
INVENTOR.
EBEN HUNTER CARRUTHERS
BY

June 17, 1952   E. H. CARRUTHERS   2,601,093
METHOD AND APPARATUS FOR PACKAGING A PREDETERMINED
WEIGHT OF FOOD MATERIAL
Filed April 14, 1948   4 Sheets-Sheet 3
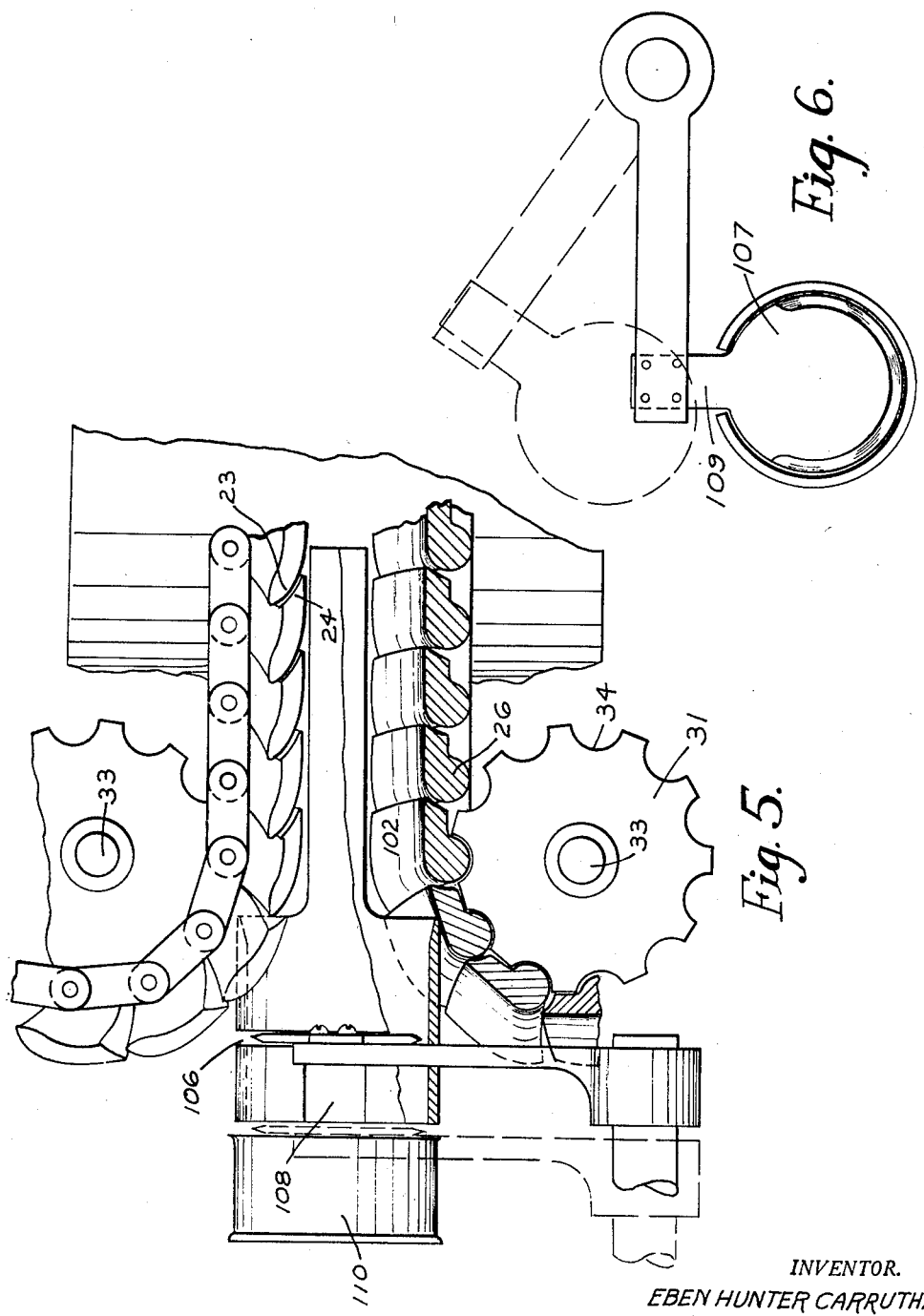
INVENTOR.
EBEN HUNTER CARRUTHERS
BY

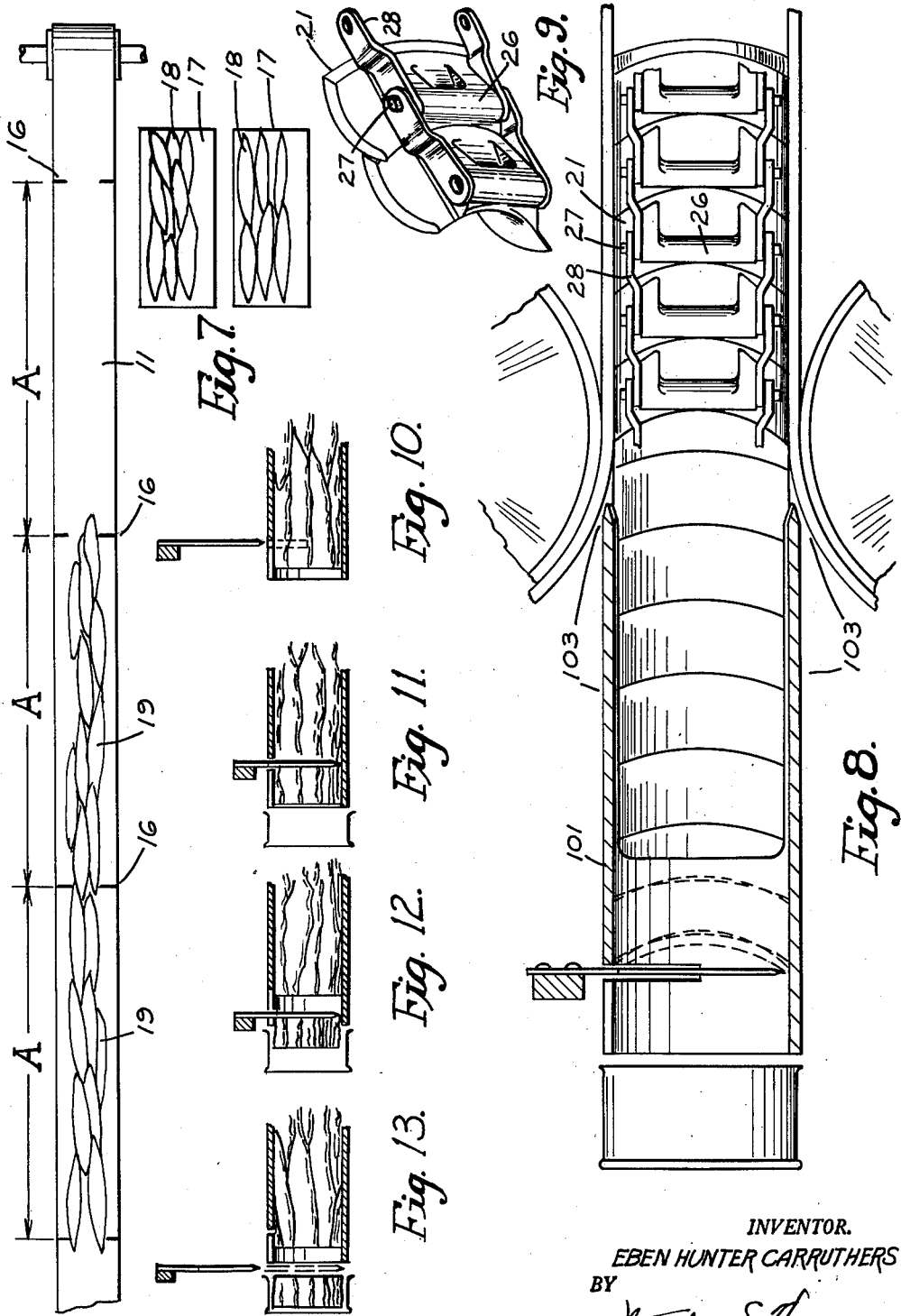

Patented June 17, 1952

2,601,093

UNITED STATES PATENT OFFICE 2,601,093

METHOD AND APPARATUS FOR PACKAGING A PREDETERMINED WEIGHT OF FOOD MATERIAL

Eben H. Carruthers, Warrenton, Oreg.

Application April 14, 1948, Serial No. 20,894

48 Claims. (Cl. 99—188)

My invention relates to a method and means or machine for packing a predetermined weight of bulk product.

While the method and machine of my invention has been particularly designed for the packing of a predetermined bulk and thereby weight of tuna in a container, it has other uses in the packing of various fish products and may be adaptable to the packing of other bulk products such as some vegetables, for example sauerkraut and spinach, and certain meat products which are packed in bulk.

Until recently, tuna fish has been packed by hand, the loins of tuna being cut transversely of the fish into pieces the height of the can. The packer then taking three or four pieces, attempted to fit these pieces into a can to provide a predetermined desired weight of tuna. In my co-pending application, Serial Number 444,510, filed May 26, 1942, now Patent Number 2,470,916 issued on May 24, 1949, I have shown a machine for weighing the pieces of tuna; separating them into groups in accordance with their weight; then combining three or more pieces to obtain a predetermined weight of tuna; and then packing that predetermined weight of fish in a can. The method and machine of that application is now in successful use in a number of canneries.

In my application Serial Number 689,146, filed August 8, 1946, now Patent Number 2,575,703 issued on November 20, 1951, and entitled "Method for Packing Food Products," I have sought to provide a method for packing tuna and other products which would eliminate the necessity of cutting the loins of tuna into chunks or pieces approximately the height of the container in which the tuna is to be packed and the elimination of the necessity of weighing the individual small pieces of tuna with the purpose of increasing production and further cutting down labor costs.

In the machine of the last mentioned application, whole loins are individually and accurately weighed and then fed to a compressing and molding tube in accordance with their weight. That is the loins are fed into the molding tube at a weight rate which is substantially constant per unit length of the conveyor which feeds the loins into the forming and molding section of the machine. After the loins of tuna have been formed into a cylindrical elongated roll of substantially constant weight per unit of length, sections of the roll are cut off and successively transferred to the containers in which the tuna is to be packed. The present invention seeks further simplification of the process of packing tuna set forth in my co-pending application Serial Number 689,146.

An object of my invention is to provide an improved method and machine for packing a predetermined weight of tuna or other bulk product in a container to the end of accomplishing increased production per machine at a saving in labor costs.

Another object of my invention is to provide an improved method and machine for packing tuna which eliminates the necessity of weighing the individual loins of tuna.

A further object of my invention is to provide a method and machine for feeding whole loins or fillets of tuna to a molding section of the machine which forms the loins of tuna into a substantially cylindrical continuous roll, while flexing or kneading the roll in a manner such as to smooth out the high and low values of weight along the length of the roll to the end that prior to cutting off predetermined lengths of the roll and transferring the cut-off lengths to the containers, the roll is not only of uniform, cross-sectional area of a diameter slightly less than that of the diameter of the can into which the tuna is packed, but also substantially uniform in weight per small unit of length of the roll to the end that the successive cut-off sections of the roll are substantially constant in weight.

My invention further contemplates an improved means for cutting off the sections of the roll and transferring the cut-off sections successively to containers progressively fed through the machine, the cutting off mechanism enabling a variation in the length of the cut to the end that the weight of tuna placed in the containers may be varied so as to pack in each of the containers the desired predetermined weight of tuna.

Other objects and advantages of the method and machine of my invention will be set forth in the claims and will be apparent from the following description, when taken in connection with the accompanying drawings, in which:

Fig. 3 is a top plan view with the top tuna feed belt broken away, better to illustrate the invention;

Fig. 4 is a sectional view taken substantially on the line 4—4 of Fig. 3 in the direction indicated by the arrows;

Fig. 5 is an enlarged view of the cut-off end of the machine with the lower forming chain shown in section to illustrate the drive therefor and showing the cut-off knife with a can in the filling position;

Fig. 6 is a view of the cut-off knife illustrating in dotted lines the position of the knife prior to cut-off and in solid lines the cut-off position;

Fig. 7 is a composite illustrative showing of how the feed belt is loaded with weighed batches of tuna along uniform lengths of the feed belt;

Fig. 8 is a view showing the end of the forming and molding section of the machine and how the tuna is fed into the cylindrical tube section at the end thereof prior to transferring a cut-off length of the roll of tuna to a container;

Fig. 9 is a perspective view showing two of the molding and forming links of the molding and forming chain;

Figs. 10, 11, 12 and 13 show successive positions of the cut-off knife and illustrating the cycle of operation thereof.

Figures 1, 2:
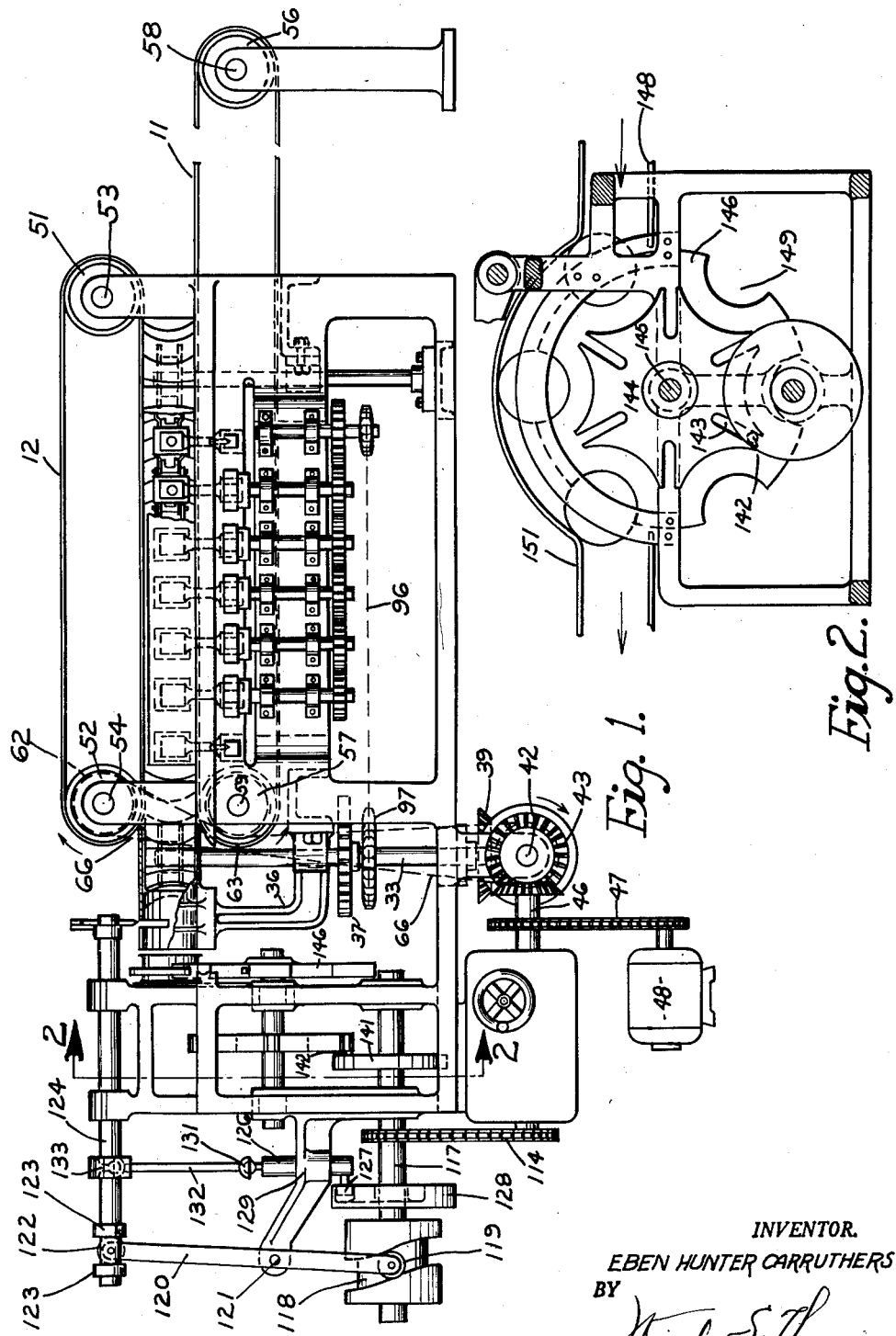
Fig. 1 is a side elevation of the machine of my invention with parts broken away and other parts in dotted lines, better to illustrate the invention.
Fig. 2 is a sectional view taken substantially on the line 2—2 of Fig. 1 in the direction indicated by the arrows.

As previously mentioned, the method and machine of my invention has been particularly designed for the packing of a predetermined weight of tuna in each of successive cans or other containers. However, the method and machine of my invention is adapted to packing other materials in bulk, such as various kinds of fish, meat and certain types of vegetables, for example, sauerkraut and spinach.

As shown in Fig. 1, the machine of my invention includes a combined feeding and forming belt 11, a forming belt 12 and a pair of forming chains 13 and 14. As shown most clearly in Fig. 7, the feed belt 11 is marked off in equal spaces, as indicated at 16. These spaces may be considered unit lengths of the feed belt and the distance between adjacent markings 16 is relatively large. Although other methods may be employed for the purposes of the present invention, the fish loins are placed on trays 17 and weighed in batches, as indicated at 18. The weight of fish loins placed on each tray is a constant amount which constant is determined by the speed of the feed belt, the rate at which the molding section of the machine, as will be presently described, can accommodate the loins and the rate at which the sections of the roll of loins may be cut off for packing in the cans.

The purpose of the equally spaced markings 16 is to enable the operator to place a weighed batch of fish 18 from one tray along the feed belt between two adjacent markings 16, as illustrated at 19 in Fig. 7. Preferably the loins are placed between and overlapping the markings so that they form a continuous line of loins with portions thereof overlapping including the loins from adjacent batches and as evenly distributed along the belt as is possible. Thus, at this step of the method of my invention, although the loins have been spread along the feed belt as evenly as possible by eye, considering small increments of the length of the belt, a difference between the weight on one small section of the belt from that existing on an adjacent similar small section of the belt may exist, in fact usually will exist even though the total weight of fish in each space of the feed belt defined by the markings 16 is the same.

While I have shown a batch manual method of loading the feed belt with fish loins to secure even weight distribution of loins over relatively long sections of the belt, it would of course be possible to employ the mechanism shown in my co-pending application Serial Number 689,146, above mentioned, for distributing the loins along the length of the feed belt more accurately. Moreover, still other methods of loading the feed belt in a manner such as more nearly to approach the ideal condition of uniform weight loading along small sections or increments of belt length, the present method involves no mechanism, is simple and after some practice the operator can place the loins along the belt in an unbroken line and sufficiently accurately for the purposes desired inasmuch as will presently be described, additional means are provided in the machine for obtaining substantially uniform weight over short sections or increments of feed belt length.

As shown most clearly in Figs. 4, 5 and 9, the molding chains 13 are made up of a series of molding elements or links 21, each of which has a concave molding face, preferably formed substantially on the arc of a circle, as shown at 22. As shown most clearly in Fig. 5, each molding element has a curved forward edge, as indicated at 23 and a curved rearward edge, as indicated at 24. This arrangement enables the molding chains to be flexed in a direction transverse to their direction of movement with adjacent molding elements shifting angularly with respect to each other, while still maintaining a substantially closed space between adjacent molding elements or links. Thus, when the chains are flexed and one molding link rotates angularly with respect to another, the curvature of the following edge of one link may rotate with respect to the leading edge of the adjacent link without interference between the two links, while still maintaining a relatively close fitting joint between the adjacent links.

As shown most clearly in Figs. 8 and 9, the rearward face of each of the molding elements 21 has a boss 26 which carries a pivot pin 27. Links 28 connect the pivot pins of adjacent molding elements 21, the links 28 being freely rotatable with respect to the pivot pins 27 to allow the above described angular movement of adjacent molding elements with respect to each other and the flexing of the chains as a whole in the manner indicated in Fig. 3.

As shown most clearly in Figs. 3 and 5, the forming chains are mounted on idler sprockets 29 and driving sprockets 31 carried by shafts 32 and 33. As shown most clearly in Fig. 5, the sprockets 29 and 31 have special semi-circularly shaped driving teeth 34 which are adapted to receive the semi-cylindrically shaped bosses 26 on the rear faces of the forming elements.

The driving sprockets 31 are mounted on the upper ends of the shafts 32 and 33 which are suitably journaled in the frame of the machine and brackets 36 thereof (see Fig. 1). The shafts 33 are driven together by means of spur gears 37 (Figs. 1 and 3) rigidly secured to the shafts 33. One of the shafts 33 has a mitre gear 39 rigidly secured thereto which meshes with a mitre gear 41 (see Fig. 3) rigidly mounted on a horizontally extending shaft 42 suitably journaled in the frame of the machine. Carried by the shaft 42 is a mitre gear 43 which meshes with a mitre gear 44 rigidly secured to a shaft 46. The shaft 46 is driven by a chain 47 and suitable sprockets (see Fig. 1) which are driven by a motor 48.

The upper feed belt 12 is mounted on an idler pulley 51 and a driving pulley 52 carried by shafts 53 and 54 suitably mounted in the frame of the machine. The lower feed belt 11 passes over a pair of pulleys 56 and 57 mounted on shafts 58 and 59. The pulley 56 is freely rotatable on the shaft 58 which is supported in bored bosses (see Fig. 3) carried by a pedestal 61.

Mounted on the shaft 54 is a sprocket 62 (Fig. 3) and mounted on the shaft 59 is a sprocket 63 (Fig. 1). Rigidly secured to the shaft 42 is a sprocket 64 over which passes a chain 66 which drives both sprockets 62 and 63 and thereby the shafts 54 and 59.

It will now be appreciated that the feed belts 11 and 12 and the forming chains are driven at approximately the same lineal speed from the shaft 42 and that the feed belts together with the forming chains form a passage for the loins of tuna roughly tubular in shape (see Fig. 4).

The return runs of each of the forming chains are carried on slide surfaces 71 formed on the frame of the machine a portion of which is indicated at 72. Carried by the frame at each side of the machine is a pair of brackets 73 which are apertured to receive pins 74. The pins carry elongated backing shoes 76 which are pressed outward into engagement with the return runs of the chains by springs 77. The purpose of the backing shoes 76 is to maintain the forming chains taut and enable the chains to clear intervening mechanism, as will be presently described.

Slidably carried in suitable openings in the side frames of the machine are a plurality of transverse rods or bars 81 (Fig. 3). Rigidly, although adjustably, mounted on each of the bars 81 is a pair of supports 82 (Fig. 4), the upper ends of which are adapted to slidably receive pins or rods 83. Each of the rods 83 supports a backing shoe 84 which is pressed by a spring 86 into engagement with the active run of the forming chain. In the drawings I have shown seven cross bars 81 and seven backing shoes for each chain, although it will be appreciated that this number may be varied and will to a certain extent depend upon the length of the forming chain and the spacing of the backing shoes desired.

Referring now to Fig. 3, it will be apparent that depending upon the position of the bars 81 and hence the backing shoes, the forming chains may be made to pursue a course as they travel from right to left, as viewed in Fig. 3, other than that of a straight line. In addition by actuating the bars in accordance with a predetermined pattern, the shoes may be made to actuate the forming chains to cause the chains to move, as they feed the material in a wave-like or serpentine manner. Moreover, the supports 82 are adjustable, as indicated at 87, so that the backing shoe supports 82 on one or more bars may be brought closer together or moved further apart as desired. Thus, the supports on the bar 81 at the extreme right of the machine may be relatively widely spaced, the supports on the next rod 81 spaced somewhat closer together and so forth working toward the left of Fig. 3 so that the space between the opposed forming chains may be gradually decreased in cross sectional area from the entrance end for the loins of tuna to the discharge end thereof.

Mounted on one end of each of the transverse bars 81 is a Scotch yoke mechanism which includes a slotted member 88 on one end of each bar in which operates a pin 98 mounted eccentrically with respect to a crank disc 89. Each of the crank discs is mounted on a shaft 90 and each of the shafts has rigidly secured thereto a spur gear 91. The gears 91 mesh with each other, as shown in Fig. 3, and are all driven by a gear 92 mounted on a suitably supported shaft 93 which also has rigidly secured thereto a sprocket 94 driven by a chain 96. The chain 96 passes over a sprocket 97 rigidly secured to the shaft 33 so as to be driven from the motor 48.

It will now be appreciated that by adjusting the Scotch yokes so that they are out of time with each other the bars 81 may be shifted so that some of them are moving in one direction while others are moving in the opposite direction. For example, the cranks of the Scotch yokes may be adjusted so as to give the forming chains a wave-like or serpentine motion. Thus, as the loins of tuna are fed through the machine the loins are bent and flexed during their passage through the forming space provided by the forming belts and the forming chain. That is, the roll of tuna is continuously flexed and kneaded during its passage so as to gradually form and shape the roll as desired, as will presently appear.

At the forward or outlet end of the forming chains is a short length of tube 101 which is best shown in Figs. 5 and 8. The rearward or entrance end of the tube is shaped to contact as closely as possible the inside curved surfaces of the forming elements or links 21, as shown at 102 (Fig. 5). Portions of the tube, as shown at 103 (Fig. 8) extend rearward or toward the entrance end for the loins of tuna and between the two forming chains to almost contact the forming belts as they pass over the pulleys.

The tube 101, therefore, forms in effect an extension of the tubular interior constituting the molding space for the loins and formed by the two forming chains and the two forming belts. Since, as previously mentioned, the continuous roll of loins of tuna is preferably gradually decreased in cross-sectional area from the entrance end toward the discharge end, the transition of the roll from the forming section of the machine into the tube 101 is accomplished smoothly and without loss of material, particularly since adjacent the discharge end of the forming section of the machine, the faces 22 of the molding elements or links have moved closer together than they are shown in Fig. 4 thus the roll of tuna is substantially cylindrical in shape at the time it is pushed into the tube by the moving chains and belts.

Adjacent the outlet end of the tube 101 is a transverse slot 106 cut approximately half way through the tube from the top thereof downward. This slot allows a knife 107 (Fig. 6) to enter the tube, as shown in full lines in Fig. 5, and extend to a position adjacent the bottom of the tube for the purpose of cutting off a section of the roll of tuna.

Extending forward from the slot 106 is a longitudinally extending slot 108 which allows the attaching part 109, together with the knife itself, to move forwardly in the tube to the dotted line position shown in Fig. 5. Since the circular portion of the knife remains in the tube during this movement, the cutoff section of the roll of tuna is moved forward with the knife as the knife is shifted from the solid to the dotted line positions shown in Fig. 5.

In Fig. 5 I have shown a can 110 in the filling position. As will appear from this view, the movement of the knife to the dotted line position pushes the cut-off section of tuna into the can. This is easily accomplished by reason of the fact that the cross-sectional area of the tube 101 is slightly less than the diameter of the can which facilitates the transition of the cut-off slice from the tube to the can.

Referring now to Figs. 1 and 3, the shaft 46 through a variable speed transmission 111, the speed of which may be varied by means of a hand wheel 112, drives a sprocket 113. The sprocket 113 through a chain 114 drives a sprocket 116 mounted on a shaft 117. The shaft 117 has rigidly secured thereto a cam element having a cam groove 118 in which a roller 119 rides. The roller 119 is rotatably secured to the end of a lever 120 which is pivoted at 121 to a support extending from the frame of the machine. The upper end of the lever 120 has a roller 122 secured thereto which is engageable with collars 123 rigidly secured to a shaft 124. The connection between the lever 120 and the shaft 124 is such as to reciprocate shaft 124 in response to the contour of the cam 118 but not to restrain it from rotary or oscillating motion.

A cam follower 126 which has secured thereto a roller 127 rides in a cam groove in the face of a cam 128. The cam follower 126 is mounted in a guide, indicated at 129, of the support arm and is connected by a ball and socket joint 131 to a connecting rod 132. The rod 132 is connected by ball and socket to a lever 133 which is fixed to shaft 124 and is adapted to impart an oscillatory motion to the shaft 124 to swing the cut-off knife from the dotted line position to the solid line position of Fig. 6. After a section of the roll has been cut off and pushed into the can, the knife is moved from a position in alignment with the tube to a position corresponding to the dotted line position of Fig. 6 except that the knife is at the time of its upward movement adjacent the forward end of the tube and clear thereof.

Cams 118 and 128 are shaped so that and maintained in proper timed relation to cause the cut off knife to go through a cycle of movements illustrated in Figs. 10, 11, 12 and 13. At the beginning of the cycle the knife is brought by the cam 118 to a position adjacent the slot, as illustrated in Fig. 10. Action of the cam 128 then causes a partial rotation of the shaft 124 to bring the cut-off knife rapidly to the position of Fig. 11 during which movement the section of tuna is cut off. The action of the cam 118 through the lever 120 then moves the cut-off knife forward through the longitudinaly extending slot 108 to push the section of tuna into a can which at this time has been positioned in the can filling position. During this portion of its movement the advance of the cut off knife is faster than the forward movement of the roll of tuna, as indicated in Fig. 12. As soon as the knife has been shifted slightly forward from the position shown in Fig. 12, it is clear of the end of the tube and the cam 128 through the lever 132 then rotates the shaft 124 to raise the knife to the position of Fig. 13. Cam 118 then returns the knife to its rearward position ready for another cutting action to be performed by operation of the cam 128.

It will be appreciated that since the shaft 117 is rotated continuously, the movement of the knife is substantially continuous and that its speed may be controlled by adjusting the variable speed transmission 111.

Mounted on the shaft 117 is a crank 141 having a crank pin 142. The crank pin 142 intermittently and successively engages, during its rotation, slots 143 of a Geneva wheel 144. The Geneva wheel is mounted on a short shaft 145 journaled in the frame of the machine and at one end thereof a can turret 146 is mounted.

The cans enter from a can track, partially indicated at 148, in the direction indicated by the arrow (Fig. 2) and are received by the semi-circular openings 149 in the can turret 146. Through the Genera motion the cans are successively presented to the can filling position, allowed to dwell there in that position until filled and then are moved to the left, as shown in Fig. 2, to enter the discharge can track 151.

The timed relation between the can turret indexing and the knife motion is such that an empty can is brought into the fish receiving position during the time the knife is moving from the position of Fig. 13 to that of Fig. 10. The dwell caused by the Geneva motion permits the knife to make its cut and push the section of tuna cut from the roll into the can before the can is then indexed out of fish receiving position and another can presented for filling adjacent the end of the tube.

Summarizing the operation, the loins of tuna or other material are placed on the feed belt in the manner above described so as to secure a substantially continuous line of fish spread longitudinally over the feed belt so that the weight of fish between adjacent markings on the feed belt, as shown in Fig. 7, is approximately uniform. As the fish loins enter the space between the forming chains, they are confined between the curved surfaces of the chains and the feed belts. The speed of all four molding surfaces being approximately the same and in the same direction, the loins are therefore carried into the confining and molding space, more or less molded to conform to that space. At the entering end the molding chains are held further apart than at the can filling or discharge end. This amount of increased opening is adjustable throughout the entire length of the substantially tubular molding space so that the molding action may be made to gradually increase, or in other words the molding space may be decreased in cross-sectional area as the loins are being subjected to the flexing action of the molding chains.

Preferably the idling sprockets 29 are arranged so that they may be adjusted toward and from each other and the supports 82 may be adjusted toward and away from each other to compress the material to a lesser or greater extent as it passes from the entrance end to the discharge end of the forming section of the machine. Preferably also the spring tension of the springs 86 may be adjusted if desired or springs of various strength may be used.

As the loins of tuna or other material progress through the tubular molding space, they are gradually molded and shaped to approximately cylindrical form of uniform cross-section. At the same time, as previously mentioned, the forming chains are given a wave or serpentine motion which bends the confined mass of fish. This bending or flexing, which is continuously reversed, causes alternate stretching and compressing of the mass on either side of the central axis of the roll of tuna. This alternate stretching and compressing causes a lengthwise slippage of the layers or flakes of the loins of tuna. Thus, a certain amount of lengthwise peripheral flow of the material takes place relative to the general forward movement of the mass. Due to the external compressive pressure, this lengthwise flow tends to move some material from the overfilled or overweight sections to the under-filled or underweight sections of the roll, thus bringing about substantially uniform weight over short increments of the length of the roll of tuna.

The cylindrical roll of material is continuously pushed through the molding space and the tube 101 at a uniform rate. As previously mentioned in connection with the discussion of Figs. 10, 11, 12 and 13, it can be seen that the knife 107 will cut off a section of the cylindrical roll and move it forward into the can already positioned to receive it. The downward cutting action of the knife is quite rapid and forward motion of the knife starts immediately after the knife has severed the material. There is then very little or no interruption of the forward movement of the cylinder of the material. In fact, the forward movement of the knife is timed so as to be considerably faster than the forward movement of the main body of material so that the knife action does not interfere with the forward motion of the material caused by the feed belts and forming chains.

One of the important features of the machine of my invention is that the knife action is completely independent of the speed of movement of the roll of material caused by the feed belts and forming chain. Thus, it will be apparent that if the knife action cycle is varied by an adjustment of the variable speed transmission 111, the knife will cut off correspondingly shorter or longer sections of the molded material. Thus, adjustment of the speed of the shaft 124 and hence the knife 107 is a means of adjusting and controlling the weight of material placed in each can.

It has been found in practice to determine the optimum feed rate of the feed belt 11 as that rate which gives the best molding action in the forming and molding section of the machine. If the machine is fed too heavily with material, excessive pressures may develop which may cause the structure of the tuna to break down. If, on the other hand, the material is not fed at a weight rate sufficient, a full and uniform cylindrical roll of the material will not be produced. The feed rate of the material to the molding section of the machine is therefore preferably determined without regard to the desired filled can weight, as the latter may be adjusted independently through the variable speed transmission 111.

Thus, the machine of my invention may be employed to form a solid pack of tuna and mold whole loins into a roll, the cross-section of which is slightly less in diameter than that of the cans; cut off a section; and push it into the can, with the weight of the cut-off section being accurately controlled by adjusting the speed of operation of the cut off knife fully independently of the rate of feed of the material through the molding section of the machine.

While I have shown and described the preferred method and machine of my invention, it will be apparent that various changes and modifications may be made therein, particularly in the form and relation of parts without departing from the spirit of my invention, as set forth in the appended claims.

I claim:

1. A method of packing a substantially constant weight of food material into each of a series of containers which comprises feeding the material toward a container filling position, forming said material into a substantially cylindrical elongated continuous roll, cutting off predetermined lengths of the roll, and transferring a cut-off length directly and in succession to each of the series of containers.

2. A method of packing a substantially constant weight of food material into each of a series of containers which comprises continuously feeding the material toward a container filling position, forming said material into a substantially cylindrical elongated continuous roll, cutting off predetermined lengths of the roll while the material is continuously fed, and transferring a cut-off length in succession to each of the series of containers.

3. A method of packing a substantially constant weight of food material into each of a series of containers which comprises continuously feeding the material at a substantially uniform average rate toward a container filling position, forming said material in such manner as to produce a roll of substantially cylindrical elongated shape of substantially uniform weight per unit of length, cutting off predetermined lengths of the roll while the roll and the cut off length are substantially continuously moved toward the filling position, and transferring a cut off length in succession to each of the series of containers without interrupting the feeding of the roll.

4. A method of packing a substantially constant weight of food material into each of a series of containers which comprises feeding the material toward a container filling position, forming said material into a substantially cylindrical elongated continuous roll of substantially uniform weight per unit of length, cutting off predetermined lengths of the roll while the roll and the cut-off length are substantially continuously moved toward the filling position, and transferring a cut-off length in succession to each of a series of containers without substantially interrupting the feeding of the roll, the movement of the material, the roll and the cut-off length being always in the same general direction.

5. A method of packing a substantially constant weight of fish having a flake structure defined by partings into each of a series of containers which comprises feeding the fish toward a container filling position, forming the fish into a substantially cylindrical elongated continuous roll, cutting off predetermined lengths of the roll, and transferring a cut-off length in succession to each of the series of containers, the movement of the fish, the feeding of the roll and the cut off length being always in the same general direction and with the partings of the flake structure of the fish always extending substantially parallel to the direction of feed.

6. A method of packing a susbtantially constant weight of food material into each of a series of containers which comprises feeding the material toward a container filling position, forming said material into an elongated structure of a shape conforming substantially to the shape of the container and which is of substantially uniform weight per unit of length by pressures applied at least part way around the structure, cutting off predetermined lengths of the structure and transferring a cut off length in succession to each of the series of containers.

7. A method of packing a substantially constant weight of food material into each of a series of containers which comprises continuously feeding the material toward a container filling position, forming said material into an elongated structure of a shape conforming substantially to the shape of the container and which is of substantially uniform weight per unit of length by pressures applied for the most part transversely of the structure, cutting off predetermined lengths of the structure while the structure and cut off length are substantially continuously moved toward the filling position, and transferring a cut off length in succession to each of the series of containers without substantially interrupting the feeding of the structure, the movement of the material, the structure and the cut off lengths being always in the same general direction.

8. A method of packing a substantially constant weight of food material into each of a series of containers which comprises feeding the material toward a container filling position, forming said material into an elongated continuous mass, resisting the forward movement of the mass by a resistance which is not uniform across a section of the mass while simultaneously applying pressure at least part way around the mass to cause lengthwise slippage of the material so that portions of the material lie in a transverse plane different from that which such portions occupied prior to slippage and the mass is gradually formed into a shape conforming substantially to the shape of the container and which is of substantially uniform weight per unit of length, cutting off predetermined lengths of the mass, and transferring a cut-off length in succession to each of the series of containers.

9. A method of packing a substantially constant weight of food material into each of a series of containers which comprises feeding the material toward a container filling position, forming said material into an elongated continuous mass, resisting the forward movement of the mass by a resistance which is not uniform across a section of the mass while simultaneously applying pressures at least part way around the mass to assist the natural tendency for the material to slip lengthwise from overloaded sections of the mass to underloaded sections thereof and the gradual formation of the mass into a substantially cylindrical elongated continuous roll of substantially uniform weight per unit of length, cutting off predetermined lengths of the roll while the roll and the cut off lengths are susbtantially continuously moved toward the filling position, and transferring a cut off length in succession to each of the series of containers without substantially interrupting the feeding of the roll, the movement of the material, the roll and the cut off length being always in the same general direction.

10. A method of packing a substantially constant weight of fish into each of a series of containers, the fish being of a character such that it has a flake layer structure extending lengthwise of the fish and around the long axis of the fish which comprises continuously feeding loins of fish in at least partly overlapping relation toward a container filling position, forming the fish into an elongated substantially cylindrical roll of substantially uniform weight per unit of length by pressures applied for the most part transversely of the flake layer structure, cutting off predetermined lengths of the roll, and transferring a cut-off length directly and in succession to each of the series of containers, the fish substantially always advancing toward the container filling position with the flake layer structure extending substantially in the direction of feed.

11. A method of packing a substantially constant weight of fish into each of a series of containers, the fish being of a character such that it has a flake layer structure extending lengthwise of the fish and around the long axis of the fish which comprises continuously feeding loins of fish in at least partly overlapping relation toward a container filling position, forming the fish into an elongated substantially cylindrical roll by pressures applied for the most part transverse to the flake layer structure while simultaneously flexing the roll to cause longitudinal slippage of the outer and inner flake layers with respect to each other to thereby smooth out the high and low values of weight along the length of the roll to obtain substantially uniform weight per unit of roll length, cutting off predetermined lengths of the roll, and transferring a cut-off length directly and in succession to each of the series of containers, the fish substantially always advancing toward the container filling position with the flake layer structure extending substantially in the direction of feed.

12. A method of packing a substantially constant weight of food material in each of a series of containers which comprises feeding the material toward a container filling position, gradually forming the material into an elongated substantially continuous structure which decreases in cross sectional area in a direction toward the container filling position until the structure is of substantially uniform weight per unit of length and the cross sectional shape of the structure substantially conforms to the cross-sectional shape of the containers, cutting off predetermined lengths of said structure, and transferring a cut-off length to each of the series of containers.

13. A method of packing a substantially constant weight of food material in each of a series of containers which comprises feeding the material toward a container filling position, gradually forming the material into an elongated substantially continuous structure which decreases in cross sectional area in a direction toward the container filling position until the structure is of substantially uniform weight per unit of length and the cross-sectional shape of the structure substantially conforms to the cross-sectional shape of the containers, cutting off predetermined lengths of said structure, transferring a cutoff length to each of the series of containers and varying the lengths of the structure cut off should the weight of the filled containers be over or under the desired weight to vary the weight of material to be placed in each of succeeding containers to thereby obtain substantially the desired weight.

14. A method of packing a substantially constant weight of food material in each of a series of containers which comprises feeding the material toward a container filling position, gradually forming the material into an elongated substantially continuous structure which decreases in cross sectional area in a direction toward the container filling position until the structure is of substantially uniform weight per unit of length and the cross-sectional shape of the structure conforms substantially to the cross-sectional shape of the containers, cutting off predetermined lengths of said structure, and transferring a cut-off length to each of the series of containers, the material being continuously fed and the structure substantially continuously advancing toward the container filling position without substantial interruption by reason of said cutting off and transferring steps.

15. A method of packing a substantially constant weight of food material in each of a series of containers which comprises moving the material toward a container filling position, forming said material into a substantially cylindrical elongated roll while reducing its diameter and flexing the roll in a manner such as to smooth out the high and low values of weight along the length of the roll and reduce said roll to a substantially uniform weight per unit of length, cutting off predetermined lengths of said roll, and transferring a cut-off length to each of the series of containers in succession.

16. A method of packing a substantially constant weight of food material in each of a series of containers which comprises moving the material toward a container filling position, forming said material into a substantially continuous elongated structure while reducing its cross sectional area and flexing the structure in a manner such as to smooth out the high and low values of weight along the length of the elongated structure and reduce said elongated structure to a substantially uniform weight per unit of length, cutting off predetermined lengths of said structure, transferring a cut-off length to each of the series of containers in succession and varying the lengths of the structure cut off when the weight of the filled containers is over or under the desired weight to vary the weight of material to be placed in each of succeeding containers and thereby obtain substantially the desired weight.

17. A method of packing a substantially constant weight of fish into each of a series of containers, the fish being of a character such that it has a flake layer formation extending lengthwise of the fish and around the long axis of the fish which comprises continuously feeding loins of fish toward a container filling position with the loins in at least partly overlapping relation and with the loins extending lengthwise of the direction of feed, forming the fish into an elongated substantially continuous structure of decreasing cross-sectional area in a direction toward the container filling position by pressures for the most part applied transversely of the layer formation to produce a lengthwise slippage of the layers and gradually to smooth out the high and low values of weight along the length of the structure and reduce said structure to substantially uniform weight per unit of length and to a cross-sectional shape conforming to the cross-sectional shape substantially of the container, cutting off predetermined lengths of the structure transversely of the layer formation and transferring the cut-off lengths in succession to the series of containers, the cutting off and transferring operations being carried out without substantially interrupting the advance of said structure toward the container filling position and with the layer formation substantially always extending in the direction of feed including the interval during transfer of the cut-off lengths to and into the containers.

18. In a method of packing a substantially constant weight of food material into each of a series of containers, the steps of continuously feeding the material to be packed, forming the material into a substantially continuous elongated structure while gradually decreasing its cross-sectional area until the cross-sectional shape of the structure substantially conforms to the cross-sectional shape of the containers to be filled and the structure is of substantially uniform weight per unit of length and while the structure is substantially continuously moved toward a cut-off position, and cutting off successive uniform lengths of the structure without substantially interrupting its movement.

19. In a method of packing a substantially constant weight of food material into each of a series of containers, the steps of continuously feeding the material to be packed, forming said material into an elongated continuous structure, resisting the forward movement of the structure by a resistance which is not uniform across a section of the structure while simultaneously applying pressures at least part way around the structure to assist the natural tendency for the material to slip lengthwise from overloaded sections of the structure to underloaded sections thereof and gradually form the structure into a shape which conforms substantially to the cross-sectional shape of the containers into which the material is to be packed and which is of substantially uniform weight per unit of length, and cutting off predetermined lengths of the structure without substantially interrupting the movement of the structure.

20. In a method of packing a substantially constant weight of fish into each of a series of containers the fish being of a character such that it has a flake layer structure extending lengthwise of the fish and around the long axis of the fish, the steps of continuously feeding loins of fish in at least partly overlapping relation toward a cut off position, forming the fish into an elongated continuous structure conforming in cross-sectional shape to the shape of the containers to be filled and of substantially uniform weight per unit of length by pressures applied for the most part transversely of the flake layer structure, and cutting off successive predetermined lengths of the structure without substantially interrupting the movement thereof.

21. In a method of packing a substantially constant weight of fish into each of a series of containers the fish being of a character such that it has a flake layer structure extending lengthwise of the fish and around the long axis of the fish, the steps of feeding loins of fish in at least partly overlapping relation toward a cut-off position, forming the fish into an elongated structure substantially conforming in cross-sectional shape to the cross-sectional shape of the containers to be filled and by pressure applied for the most part transversely of the flake layer formation and by simultaneously flexing the structure to cause longitudinal slippage of the outer and inner flake layers with respect to each other to thereby smooth out the high and low values of weight along the length of the structure to obtain substantially uniform weight per unit of structure length, and cutting off successive predetermined lengths of the structure.

22. In a method of packing a substantially constant weight of food material into each of a series of containers, the steps of feeding the material to be packed, and forming the material into a substantially continuous elongated structure of a cross-sectional shape substantially conforming to the cross-sectional shape of the containers to be filled while continuing to feed the material, the forming forces being directed transversely of the direction of feed.

23. In a method of packing a substantially constant weight of fish into each of a series of containers, the steps of continuously feeding loins of fish in overlapping relation, forming the loins into a substantially continuous elongated structure of gradually decreasing cross-sectional area until the structure is of a cross-sectional area and shape substantially conforming to the cross-sectional area and shape of the containers to be filled while the elongated structure is continuously moved in the direction of feed and toward a container filling position, the forming forces being directed transversely to the direction of feed of the loins.

24. In a method of packing a substantially constant desired weight of fish in each of a series of containers the steps of feeding loins of fish toward a cut off position with the long axes of the loins in the direction of feed and with the loins in overlapping relation both longitudinally and transversely, forming said loins while completely enclosed into a substantially homogeneous mass of substantially a desired cross section by pressure applied transversely of the direction of feed and over a continuous length of the mass greater than the height of the container in which the fish is to be packed, and cutting off sections of said mass transversely of the direction of feed.

25. In a method of packing a substantially constant desired weight of fish in each of a series of containers the steps of feeding loins of fish toward a cut off position with the long axes of the loins in the direction of feed and with the loins in overlapping relation both longitudinally and transversely, forming said loins into a substantially homogeneous mass of substantially a desired cross-section by pressure applied transversely of the direction of feed, cutting off sections of said mass transversely of the direction of feed, and varying the thickness of the sections of the mass cut off to control weight, the overlapping relation of the loins insuring that part of more than one loin will be in substantially every section cut off.

26. In a method of packing a substantially constant desired weight of fish in each of a series of containers, the fish being of a character such that it has a flake layer formation extending lengthwise of the fish and around the long axis of the fish, the steps of feeding loins of fish toward a cut off position with the long axes of the loins extending in the direction of feed and with the loins in overlapping relation both longitudinally and transversely, forming said loins into a substantially homogeneous mass of a desired cross-section by pressures applied substantially only transversely of the flake layer formation, and cutting off sections of said mass transversely of the direction of feed while the periphery of the mass adjacent the cut is encompassed and confined against any substantial transverse distortion.

27. In a method of packing a substantially constant desired weight of fish in each of a series of containers the fish being of a character such that it has a flake layer formation extending lengthwise of the fish and around the long axis of the fish, the steps of feeding loins of fish toward a cut off position with the long axes of the loins extending in the direction of feed and with the loins in overlapping relation both longitudinally and transversely, forming said loins while completely enclosed into a substantially homogeneous mass of a desired cross-section by pressures applied substantially only transversely of the flake layer formation and over a continuous length of the mass greater than the height of the container in which the fish is to be packed, cutting off sections of said mass transversely of the direction of feed and varying the thickness of the sections of the mass cut off to control weight, the overlapping relation of the loins insuring that parts of more than one loin will be in substantially every section cut off.

28. A machine for packing a substantially constant weight of material in each of a series of containers comprising, in combination, a conveyor, said conveyor being loaded with material to be packed distributed along the conveyor approximately in accordance with a constant weight per relatively long unit of length of the conveyor, molding means, means for driving said conveyor and said molding means, means for moving said molding means in a serpentine manner in a direction transverse to the direction in which it is driven to flex and knead the material to form a continuous roll which is substantially constant in weight over relatively short units of length of the roll, said machine having a container filling position and including means for feeding the containers to said container filling position in succession, and means for cutting off sections of said roll of predetermined length in succession and in synchronism with the presentation of containers to said container filling position.

29. A machine for packing a substantially constant weight of material in each of a series of containers comprising, in combination, a molding unit which includes a plurality of molding elements forming at least a partial enclosure for the material being packed, means for driving the molding elements at substantially the same lineal speed, and means for moving at least some of said molding elements backwardly and forwardly in a direction transverse to the direction in which they are driven.

30. A machine for packing a substantially constant weight of material in each of a series of containers comprising, in combination, a molding unit which includes a plurality of molding elements forming a moving elongated at least partial enclosure for the material being packed, means for driving the molding elements at substantially the same lineal speed, means for moving at least some of said molding elements backward and forward in a direction transverse to the direction in which they are driven, said molding unit forming the material into a continuous roll of substantially constant weight per unit of length, said machine having a container filling position, means for feeding the containers successively to said container filling position, and means for successively cutting off sections of said roll of predetermined length and transferring a section to each of the series of containers.

31. A machine for packing a substantially constant weight of material in each of a series of containers comprising, in combination, a conveyor loaded with material to be packed in such manner that the material lies on the conveyor in a substantially continuous unbroken line, a molding unit comprising said conveyor and continuous molding elements forming a complete elongated enclosure about said material, said machine having a filling position and means for feeding the containers to said filling position in succession, means for driving said conveyor and said molding elements at substantially the same lineal speed to feed said material toward said filling position, said conveyor and molding elements being arranged in a manner such that the molding space gradually decreases in cross-sectional area from the material entrance end in a direction toward said filling position and said material is formed into a roll of a diameter less than the diameter of the container, means acting upon said molding unit to actuate portions of it and flex said roll in a direction transverse to the direction of feed of said material, and means for successively cutting off sections of said material of a predetermined length and transferring a section to each of said containers as they are succesively presented to said filling position.

32. A machine for packing a substantially constant weight of material in each of a series of containers comprising, in combination, a conveyor loaded with material to be packed in such manner that the material lies on the conveyor in a substantially continuous unbroken line, a molding unit comprising said conveyor and molding elements forming a complete enclosure about said material, said machine having a filling position and means for feeding the containers to said filling position in succession, means for driving said conveyor and said molding elements at substantially the same lineal speed to feed said material to said filling position, said conveyor and molding elements being arranged in a manner such that the molding space gradually decreases in cross-sectional area from the material entrance end in a direction toward said filling position, a stationary cylindrical member between the end of said molding unit and said filling position into which the roll is fed by said molding unit, and means for successively cutting off sections of said material of a predetermined length and transferring a section to each of said containers as they are succesively presented to said filling position.

33. A machine for packing a substantially constant weight of material in each of a series of containers comprising, in combination, a conveyor loaded with material to be packed in such manner that the material lies on the conveyor in a substantially continuous unbroken line, a moulding unit comprising said conveyor and molding elements forming a complete enclosure about said material, said machine having a filling position and means for feeding the containers to said filling position in succession, means for driving said conveyor and said molding elements at substantially the same lineal speed to feed said material to said filling position, said conveyor and molding elements being arranged in a manner such that the molding space gradually decreases in cross-sectional area from the material entrance end in a direction toward said filling position, a cylindrical member adjacent said filling position into which the material is fed, and means including a cut-off knife movable into and out of said cylindrical member for succesively cutting off sections of said material of a predetermined length and transferring a section to each of said containers as they are successively presented to said filling position.

34. In a machine for packing a substantially constant weight of material in each of a series of containers wherein a moulding unit feeds the material toward a container filling position and molds the material into an elongated substantially cylindrical roll, the combination of a stationary cylindrical member between the molding unit and the filling position into which the roll is fed by the molding unit, said cylindrical member having a knife slot extending transversely of the long axis thereof and a knife slot extending from the end of the cylindrical member adjacent the filling position longitudinally thereof and merging into the transverse slot, a cut-off knife, having an arm, means connected to said arm for moving said cut-off knife into said transverse slot to cut off a section of said roll, means for moving containers successively into the filling position, and means connected to said arm for moving said cut-off knife toward the container with said arm moving through said longitudinal slot to transfer the cut-off section of said roll to the container.

35. In a machine for packing a substantially constant weight of material in each of a series of containers wherein a molding unit feeds the material toward a container filling position and molds the material into an elongated substantially cylindrical roll, the combination of a stationary cylindrical member between the molding unit and the filling position into which the roll is fed by the molding unit, said cylindrical member having a knife slot extending transversely of the long axis thereof and a knife slot extending from the end of the cylindrical member adjacent the filling position longitudinally thereof and merging into the transverse slot, a cut-off knife having an arm, means for moving containers successively into the filling position, means connected to said arm for moving said cut-off knife toward the container with said arm moving through said longitudinal slot to transfer the cut-off section of said roll to the container, and means for varying the length of the section of roll cut-off.

36. A machine for packing a substantially constant weight of material in each of a series of containers comprising, in combination, a conveyor upon which the material is placed, means forming with the conveyor an enclosure for the material, said means comprising a pair of members having molding elements the molding surfaces of which face each other, means for driving said members continuously with the molding surfaces exerting a moulding action on the material to mold it into a cross-sectional shape similar to but slightly smaller than the open end of the container in which the material is to be packed, means for cutting off predetermined lengths of the product while the material is continuously advanced, means for transferring the cut-off lengths in succession to the series of containers and means for imparting a wavelike motion to said members as the molding elements advance toward the cutting off position.

37. A machine for packing a substantially constant weight of material in each of a series of containers comprising, in combination, a conveyor upon which the material is placed, means forming with the conveyor an enclosure for the material, said means comprising a pair of members having molding elements the molding surfaces of which face each other, means for driving said members continuously with the molding surfaces exerting a moulding action on the material to mold it into a cross-sectional shape similar to the shape of the open end of the container in which the material is to be packed, a receiving element corresponding in cross-sectional shape to the cross-sectional shape of the containers, a cut-off knife, said receiving element having transverse and longitudinal slots which merge with each other for the reception of the knife, means for moving the cut-off knife through the transverse slot to cut a slice from the material and means for moving the knife through the longitudinal slot to transfer the cut-off slice to a container.

38. A machine for packing a substantially constant weight of material in each of a series of containers wherein the containers are presented to a filling position in succession, in combination, a conveyor upon which the material to be packed is placed for feeding toward the container filling position, means forming together with said conveyor a tunnel at least some of the walls of which are movable to feed the material, said means including a pair of opposed and driven molding chains having molding surfaces which are curved on substantially the arc of a circle with the molding surfaces facing each other, said molding chains having backing elements which are independent of each other and at least some of which are movable, means for driving said molding chains to convey the product toward the container filling position, means for cutting off slices of the material in succession, and means for transferring the cut-off slices to the containers as they are successively presented in the container filling position.

39. A machine for packing a substantially constant weight of material in each of a series of containers wherein the containers are presented to a filling position in succession, in combination, a conveyor upon which the material to be packed is placed for feeding toward the container filling position, means forming together with said conveyor a tunnel at least some of the walls of which are movable to feed the material, said means including a pair of opposed and driven molding chains having molding surfaces which are curved on substantially the arc of a circle with the molding surfaces facing each other, said molding chains having yieldingly mounted backing elements which are independent of each other and at least some of which are movable, means including said backing elements for imparting to the molding chains a controlled flexing action in a direction transverse to the direction in which they are driven, means for driving said molding chains to convey the product toward the container filling position, means for cutting off slices of the material in succession, and means for transferring the cut-off slices to the containers as they are successively presented in the container filling position.

40. A machine for packing a substantially constant weight of material in each of a series of containers wherein the containers are presented to a filling position in succession, in combination, a conveyor upon which the material to be packed is placed for feeding toward the container filling position, means forming together with said conveyor a tunnel at least some of the walls of which are movable to feed the material, said means including a pair of opposed and driven molding chains having facing molding surfaces which are shaped to conform the material to the shape of the container opening, said molding chains having backing elements which are independent of each other, said backing elements being spaced apart at the entrance end of the tunnel so that a relatively large entrance opening is presented for the material and being spaced more closely together toward the container filling position so that the molding space within the tunnel gradually decreases in cross-sectional area, means for driving said molding chains to convey the product toward the container filling position, means for cutting off slices of the material in succession, and means for transferring the cut-off slices to the containers as they are successively presented in the container filling position.

41. A machine for packing a substantially constant weight of material in each of a series of containers wherein the containers are presented to a filling position in succession, in combination, a conveyor upon which the material to be packed is placed for feeding toward the container filling position, means forming together with said conveyor a tunnel at least some of the walls of which are movable to feed the material, said means including a pair of opposed and driven molding chains having molding surfaces which are curved on substantially the arc of a circle with the molding surfaces facing each other, said molding chains having mounting elements which are independent of each other so that the molding surfaces on opposite chains may shift toward and away from each other, means for driving said molding chains to convey the product toward the container filling position, a stationary support at the discharge end of said tunnel for the reception of the material, means for cutting off slices of the material in succession while the material is in contact with the support and means for transferring the cut-off slices in a direction parallel to the axis of the tunnel from the support to the containers as they are successively presented in the container filling position.

42. A machine for packing a substantially constant weight of material in each of a series of containers comprising, in combination, molding means for molding the material into a desired cross-sectional shape, cut off means for cutting off a length of the material, driving elements for advancing the molding means, driving elements for actuating the cut off means, and means for varying the speed of operation of the driving elements for one of said means with relation to the speed of operation of the driving elements for the other of said means to vary the length of the material cut off.

43. A machine for packing a substantially constant weight of material in each of a series of containers wherein the containers are presented to a filling position in succession comprising, in combination, molding means for molding the material into a cross-sectional shape substantially conforming to the shape of the containers which the material is to occupy, cut off means for cutting off a length of the material, driving elements for advancing the molding means, driving elements for actuating the cut off means, means for varying the speed of operation of the driving elements for one of said means with relation to the speed of operation of the driving elements for the other of said means to vary the length of the material cut off, and means for moving at least part of the cut off means in the direction of movement of the molding means after the length of material has been cut off to deposit said cut off length in a container presented in the filling position.

44. Mechanism for cutting off a section of material to be packed in a container comprising, in combination, cut off means, substantially tubular means substantially enclosing the material to be packed, said tubular means having a slot which extends at least part way therethrough substantially normal to the long axis of the tubular means and having a slot which extends from said normal slot in a direction substantially parallel to the long axis of said tubular means, means for moving said cut off means through said normal slot in a direction substantially perpendicular to the material to cut off a section of the material, and means for moving at least part of said cut off means through said tubular means with a portion thereof extending through said parallel slot to push the material into a container.

45. A machine for packing a substantially constant desired weight of fish in each of a series of containers comprising, in combination, molding means forming a tunnel having walls at least some of which are movable in a direction such as to feed the fish, said molding means being constructed and arranged so as to receive loins of fish in overlapping relation in a preferably unbroken flow, driving elements for advancing the molding means so that the loins of fish are fed toward a cut off position, said molding means exerting pressure on the loins of fish in a direction transverse to the direction in which the loins are fed to mold the overlapping loins into a substantially homogeneous structure of a desired cross-sectional shape, cut off means adjacent the cut off position for cutting off successive slices of the molded fish, said cut off means being movable on its cutting stroke in a direction substantially normal to the direction in which the fish being molding is fed, driving elements for actuating the cut off means, the driving elements for the molding means and the driving elements for the cut off means being driven in a relationship to each other such that the thickness of the slices cut off may be retained normally at a constant, and means for varying the speed of operation of one of said driving elements with relation to the speed of operation of the other of said driving elements to vary the thickness of the slices cut off.

46. In a machine for packing a substantially constant weight of fish in each of a series of containers comprising, in combination, molding means forming a tunnel having walls at least some of which are movable in a direction such as to feed the fish, said molding means forming an entrance to the tunnel which is of substantially greater cross-sectional area than the maximum cross-sectional area of the tunnel so that loins of fish may freely enter said entrance in overlapping relation in a preferably unbroken flow and in a bulk of greater cross-sectional area than that to which said fish is to be molded, driving element for advancing the molding means so that the loins of tuna move toward a cut off position, said molding means having at least some of the walls thereof yielding in a direction substantially normal to the direction in which the loins are moved to exert a yielding pressure on the loins in a direction substantially normal to the direction in which the loins move to mold the overlapping loins into a homogeneous structure of a desired cross-sectional shape and of substantially constant weight per unit of length, cut off means adjacent the cut off position for cutting off successive slices of the molded loins, said cut off means being movable on its cutting stroke in a direction substantially normal to the direction in which the loins being molded are moved, driving elements for actuating the cut off means, the driving elements for the molding means and the driving elements for the cut off means being driven in a relationship to each other such that the thickness of the slices and hence their weight may be retained substantially at a constant, and means including a manually adjustable variable speed mechanism adjustable without interrupting the operation of the machine for varying the speed of operation of one of said driving elements with relation to the speed of operation of the other of said driving elements to vary the thickness and hence the weight of the slices cut off.

47. A machine for packing a substantially constant desired weight of fish in each of a series of containers comprising, in combination, molding means forming a tunnel having walls at least some of which are movable in a direction such as to feed the fish, said molding means being constructed and arranged so as to receive loins of fish in overlapping relation in a preferably unbroken flow, driving elements for advancing the molding means so that the loins of fish are fed toward a cut off position, said molding means exerting pressure on the loins of fish in a direction transverse to the direction in which the loins are fed to mold the overlapping loins into a substantially homogeneous structure of a desired cross-sectional shape, cut off means adjacent the cut off position for cutting off successive slices of the molded fish, said cut off means being movable on its cutting stroke in a direction substantially normal to the direction in which the fish being molded is fed, driving elements for actuating the cut off means, and a stationary throat adjacent the cut off position, said throat encompassing and confining the molded fish during the cut off stroke of the cut off means.

48. A machine for packing a substantially constant desired weight of fish in each of a series of containers comprising, in combination, molding means forming a tunnel having walls at least some of which are movable in a direction such as to feed the fish, said molding means being constructed and arranged so as to receive loins of fish in overlapping relation in a preferably unbroken flow, driving elements for advancing the molding means so that the loins of fish are fed toward a cut off position, said molding means exerting pressure on the loins of fish in a direction transverse to the direction in which the loins are fed to mold the overlapping loins into a substantially homogeneous structure of a desired cross-sectional shape, cut off means adjacent the cut off position for cutting off successive slices of the molded fish, said cut off means being movable on its cutting stroke in a direction substantially normal to the direction in which the fish being molded is fed, driving elements for actuating the cut off means, the driving elements for the molding means and the driving elements for the cut off means being driven in a relationship to each other such that the thickness of the slices cut off may be retained normally at a constant, means for varying the speed of operation of one of said driving elements with relation to the speed of operation of the other of said driving elements to vary the thickness of the slices cut off, and a stationary throat adjacent the cut off position having a slot for the reception of the cut off means and said throat encompassing and confining the molded fish during the cut off stroke of the cut off means.

EBEN H. CARRUTHERS.

(References on following page)

REFERENCES CITED

The following references are of record in the file of this patent:

UNITED STATES PATENTS

| Number | Name | Date |
|---|---|---|
| 13,807 | Wicks | Nov. 13, 1855 |
| 1,415,075 | Wilbur | May 9, 1922 |
| 1,780,382 | Fahrenwald | Nov. 4, 1930 |
| 1,810,740 | Vogt | June 16, 1931 |
| 2,006,376 | Vogt | July 2, 1935 |
| 2,037,724 | Jacobs et al. | Apr. 21, 1936 |
| 2,043,684 | Walter | June 9, 1936 |
| 2,048,156 | Gardner et al. | July 21, 1936 |
| 2,068,407 | Goldstein et al. | Jan. 19, 1937 |
| 2,187,253 | Wallace | Jan. 16, 1940 |
| 2,187,254 | Wallace | Jan. 16, 1940 |
| 2,297,419 | Korber | Sept. 29, 1942 |
| 2,319,900 | De Back | May 25, 1943 |
| 2,413,556 | Fourness et al. | Dec. 31, 1946 |
| 2,468,229 | Olander | Apr. 26, 1949 |

FOREIGN PATENTS

| Number | Country | Date |
|---|---|---|
| 512,545 | Great Britain | Sept. 19, 1939 |
| 413,602 | Germany | May 12, 1925 |